United States Patent
Kao

(10) Patent No.: US 6,799,773 B2
(45) Date of Patent: Oct. 5, 2004

(54) LOW DRAG BIKE SEAT STEM

(76) Inventor: Yu-Ju Kao, 58, Ma Yuan West St., Taichung (TW)

( * ) Notice: Subject to any disclaimer, the term of this patent is extended or adjusted under 35 U.S.C. 154(b) by 0 days.

(21) Appl. No.: 10/384,489

(22) Filed: Mar. 4, 2003

(65) Prior Publication Data

US 2004/0173990 A1 Sep. 9, 2004

(51) Int. Cl.$^7$ .................................................. B62K 1/00
(52) U.S. Cl. .................................. 280/281.1; 280/288.4
(58) Field of Search ............................... 280/281.1, 283, 280/278, 288.3, 288.4; 297/195.1; D25/126

(56) References Cited

U.S. PATENT DOCUMENTS

| | | | | |
|---|---|---|---|---|
| 626,396 A | * | 6/1899 | Smith | 267/196 |
| 4,712,811 A | * | 12/1987 | Wier | 285/113 |
| 4,900,048 A | * | 2/1990 | Derujinsky | 280/281.1 |
| 4,925,203 A | * | 5/1990 | Buckler | 280/278 |
| RE33,295 E | * | 8/1990 | Trimble | 280/281.1 |
| 5,324,059 A | * | 6/1994 | Bryne | 280/283 |
| 5,364,160 A | * | 11/1994 | Fritschen et al. | 297/195.1 |
| 5,382,039 A | * | 1/1995 | Hawker | 280/283 |
| 6,017,048 A | * | 1/2000 | Fritschen | 280/281.1 |
| 6,158,881 A | * | 12/2000 | Carne | 362/473 |
| 6,213,488 B1 | * | 4/2001 | Filice et al. | 280/281.1 |

FOREIGN PATENT DOCUMENTS

| | | | | |
|---|---|---|---|---|
| DE | 29920648 U1 | * | 2/2000 | B62K/15/00 |
| FR | 2497756 A | * | 7/1982 | B62K/19/34 |

* cited by examiner

Primary Examiner—Lesley D. Morris
Assistant Examiner—Daniel Yeagley
(74) Attorney, Agent, or Firm—Charles E. Baxley

(57) ABSTRACT

A low drag bike seat stem comprised of a joint and a briolette shaped tube; an insertion cap being built in the seat tube; the height of the tube being adjustable and secured in the seat tube; the joint being connected to the upper end of the briolette shaped tube; and a clamping hole in shape related to that of the briolette shaped tube being provided in the center of the insertion cap for the tube to be fully inserted through the insertion cap.

3 Claims, 6 Drawing Sheets

LOW DRAG BIKE SEAT STEM

BACKGROUND OF THE INVENTION (a) Field of the Invention

The present invention is related to a low drag bike seat stem, and more particularly to one comprised of a joint and a tube in briolette shape for the stem to be adapted with an insertion cap to be inserted to the seat tube for adjusting and securing its height.

(b) Description of the Prior Art

Usually, a bike seat stem relates to an integrated structure comprised of a joint and a tube. Though the configuration may differ, the tube of the prior art indicates a round retractable tube to be inserted and secured to the seat tube. As illustrated in FIG. 7 of the accompanying drawings of the present invention, a seat stem with low drag of the prior art is essentially comprised of an integrated joint and tube. Wherein, the upper section of the tube is modified so to indicate a sharp style. Said upper section having a sharp tube 10 is thus reserved as the seat tube; and the lower section 20 of the tube, to be inserted and locked into the seat tube.

However, the sharp tube 10 of the prior art is not in circular, therefore, is prevented from being locked deep into the circular, hollow seat tube. Consequently, the length to permit descending of the seat tube is restricted to where not lower than the sharp tube 10. Similarly, if the seat tube is elevated, the lower section 20 of the seat stem is partially exposed to increase the drag. Accordingly, the low drag bike seat stem fails an arbitrary elevation for its full length. Furthermore, as the size of tube varies, there is the absence of a bike seat tube with an inner diameter generally applicable to the entire seat stem.

SUMMARY OF THE INVENTION

The primary purpose of the present invention is to provide a bike seat stem comprised of a joint and a tube with the full length of the tube having a briolette shape of gradually reducing to one side so that a low drag bike seat stem is formed once the joint is inserted and incorporated to the upper end of the tube. The entire tube can be extruded for easier production and saving production cost.

Another purpose of the present invention is to provide a low drag bike seat stem, which is adapted to an insertion cap built-in bike seat stem, to allow free elevation of the full length of the stem to be locked into the bike seat tube as desired to ensure its low drag effects.

DETAILED DESCRIPTION OF THE PREFERRED EMBODIMENTS

Figure 1:
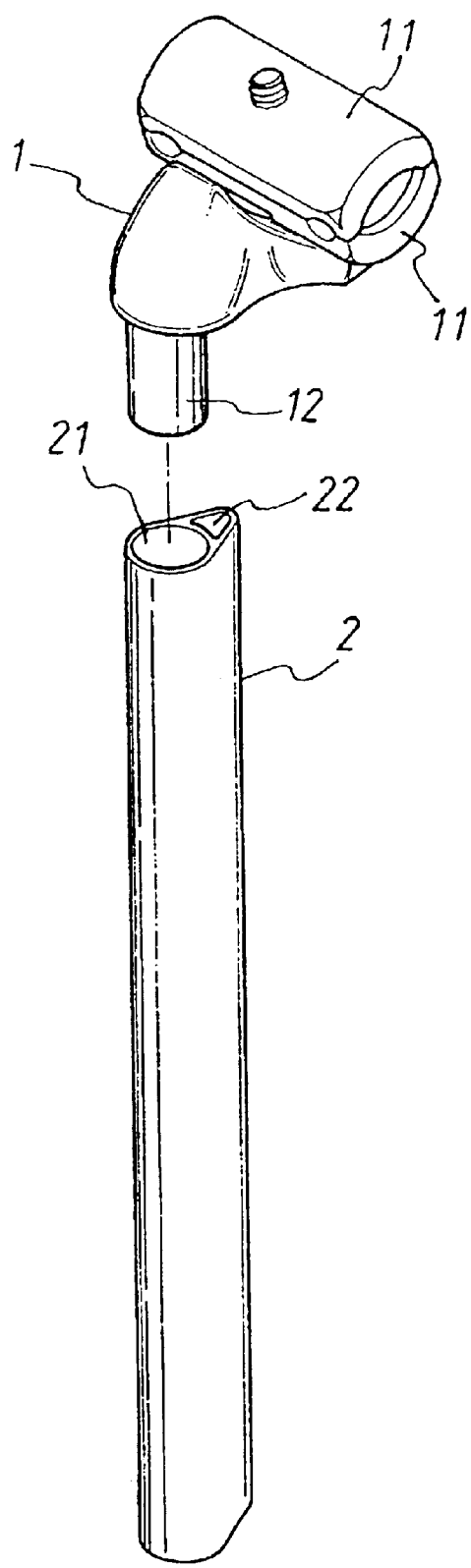
FIG. 1 is a perspective view of a preferred embodiment of the present invention.
Figure 2:
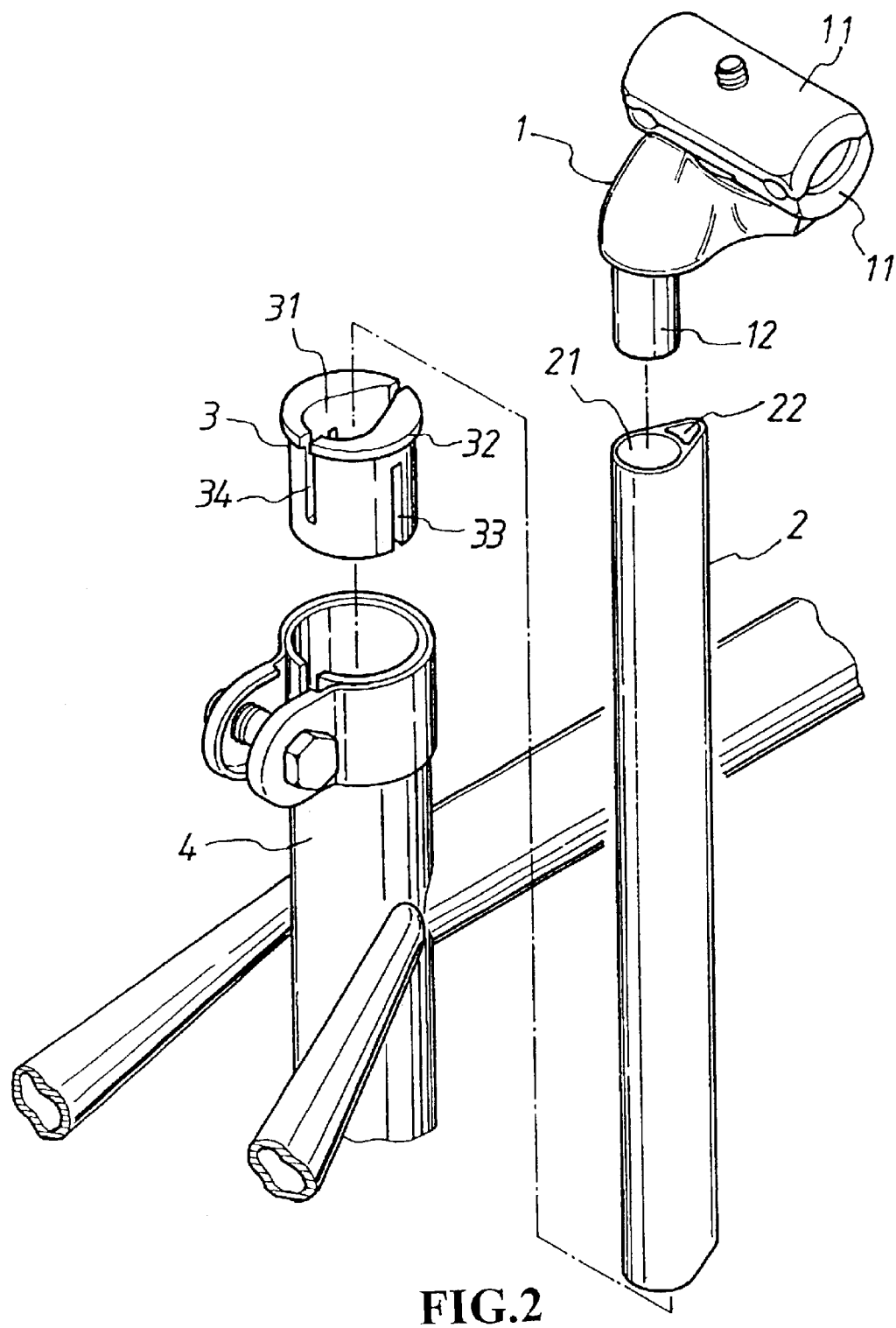
FIG. 2 is another perspective view of the preferred embodiment of the present invention adapted with an insertion cap to be assembled with a bike seat tube.
Figure 3:
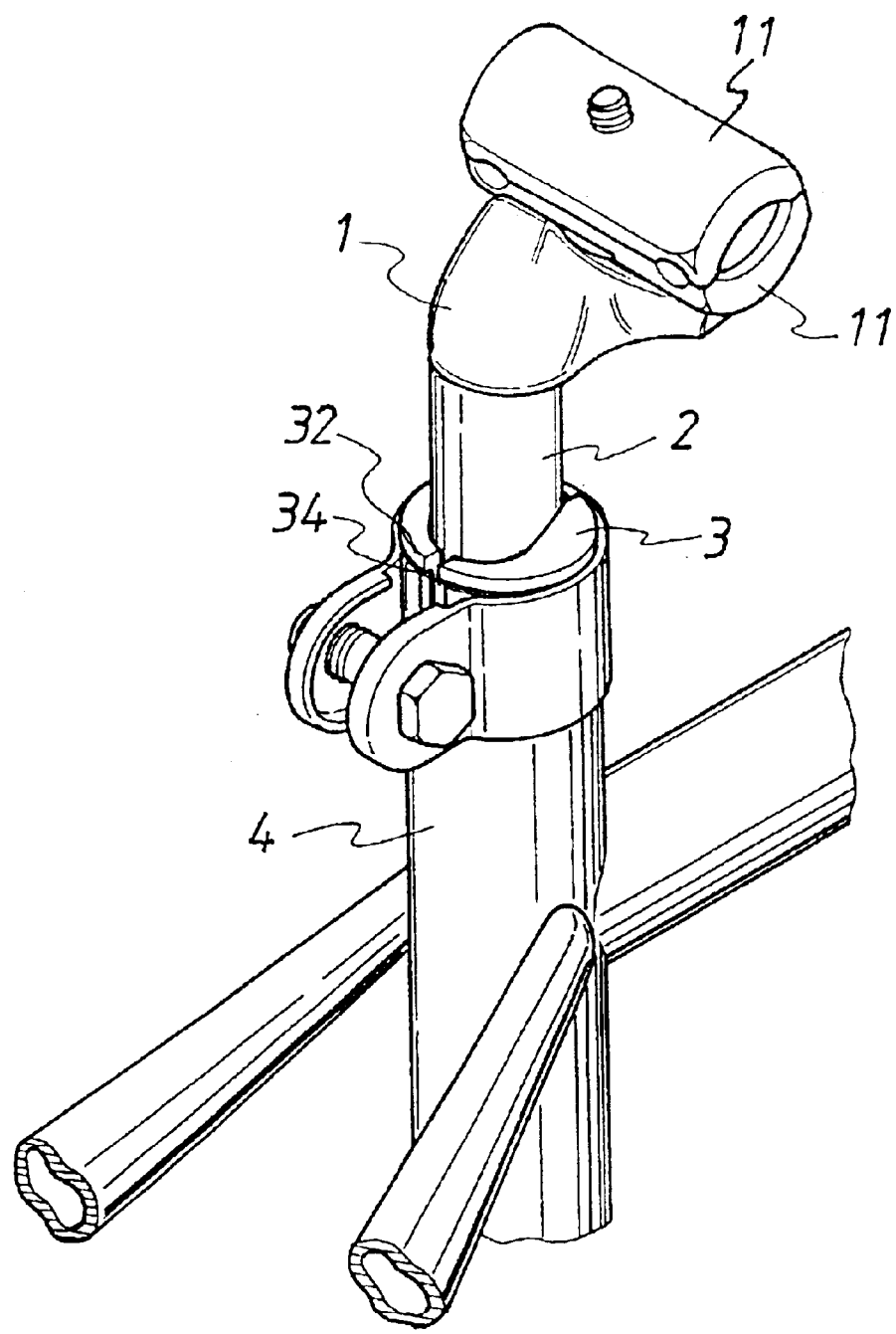
FIG. 3 is a perspective view of the preferred embodiment of the present invention with its tube properly descended.

Referring to FIGS. 1, 2 and 3, a bike seat stem of the present invention is essentially comprised of a joint 1 and a tube 2 to form a low drag bike seat stem in conjunction with an insertion cap 3 to be mounted to a bike seat tube 4. Wherein, the joint 1 is a generally known member having its upper end provided with two locking clamps 11 longitudinally corresponding to each other to retain a metal tube provided at the bottom of the bike seat while its lower end being provided with a gradation 12; however, a locking structure at the upper end of the joint 1 may be provided by compromising the type of any joint of the prior art, and thus is not required to be limited to a particular type.

The tube 2 relates to a low drag pipe in a briolette shape with its one side gradually reducing to a point. Within, one side indicates point while the other side having a larger arc portion, or the tube 2 may be any selected shape as long as it provides the low drag as expected. The tube 2 may be made solid or hollow. However, for easy production and saving material, or for the purpose of reinforced structure, the tube 2 may be of an extruded hollow body to receive insertion by the joint 1 to the upper end of the tube 2.

The insertion cap 3, built in the bike seat tube 4, has its body indicating a circular cap. A clamping hole 31 is provided at the center of the insertion cap 3 in a shape matching the point side of the tube 2 to receive the full insertion of the tube 2. The upper end of the insertion cap 3 is also provided with a graded ring 32 to hold on and get positioned in an open wall of the seat tube 4 so to prevent the insertion cap 3 from falling off. Furthermore, one or more than one cut 33 is provided on the wall of the insertion cap 3 to provide flexible packing effect when the insertion cap 3 is inserted into the bike seat tube 4. Similarly, one or more than one 34 can be provided to the clamping hole 31 to facilitate penetration of the tube 21 while giving the same flexible packing effect.

Figure 4:
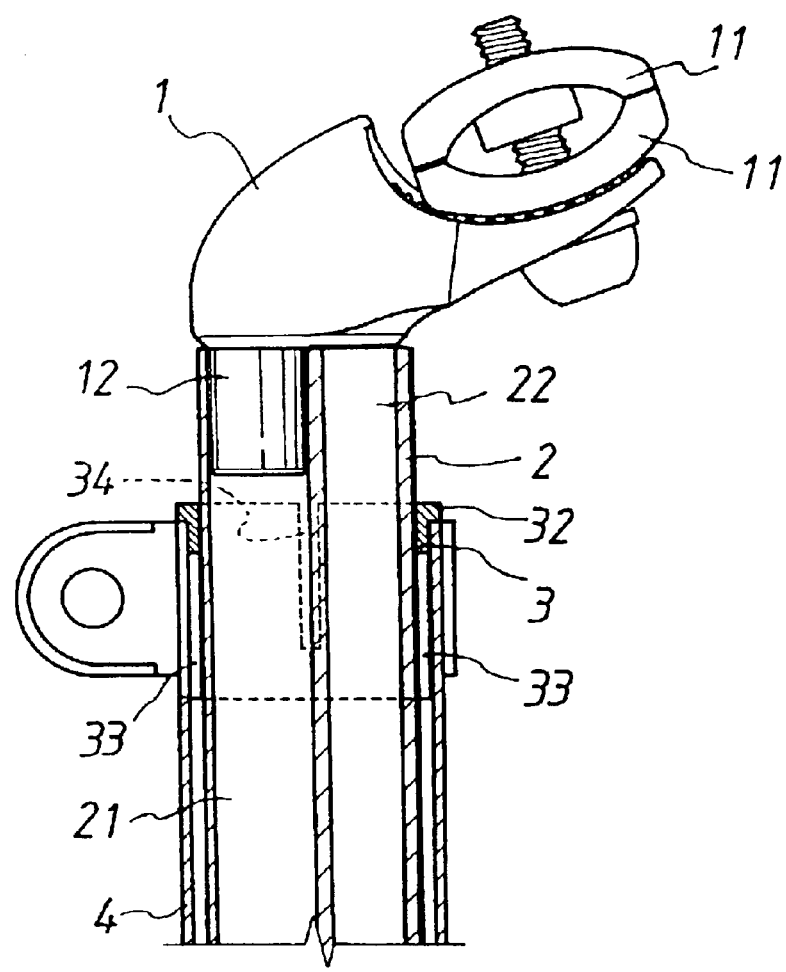
FIG. 4 is a view of longitudinal section of the preferred embodiment of the present invention.
Figure 5:
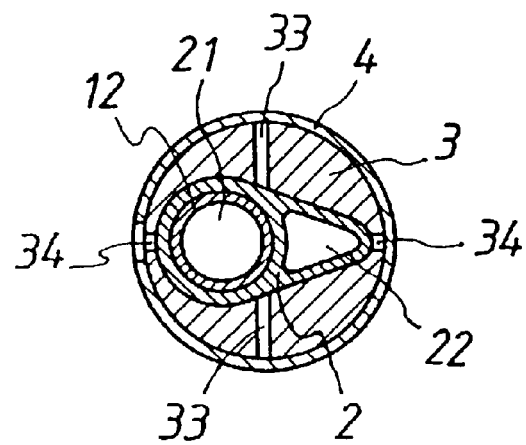
FIG. 5 is a view of cross section of the preferred embodiment of the present invention.
Figure 6:
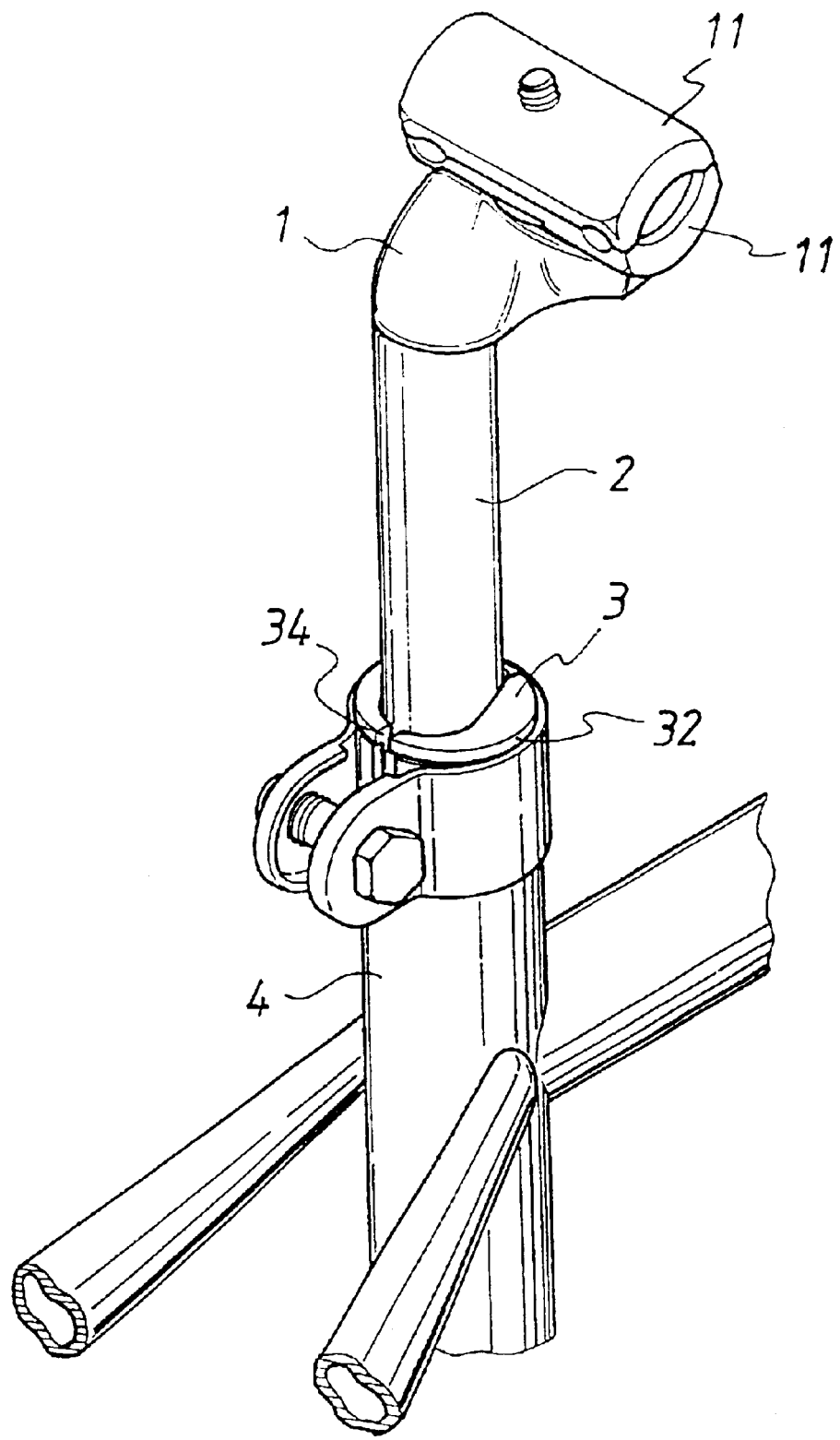
FIG. 6 is a perspective view of the preferred embodiment of the present invention with its tube properly elevated.
Figure 7:
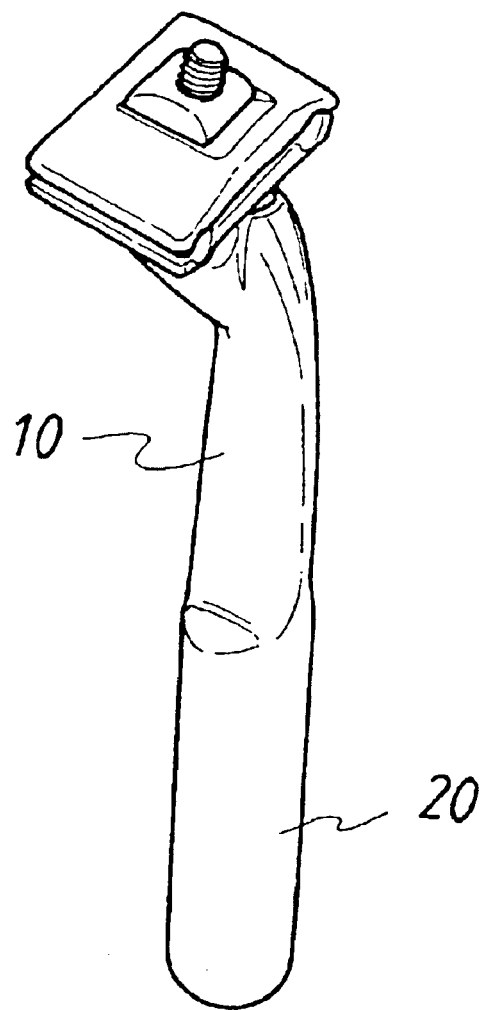
FIG. 7 is a perspective view of a bike seat stem of the prior art.

The assembly of the bike seat stem with those members as described above relates to having the insertion cap 3 built in the bike seat tube 4; the joint 1 being connected to the upper end of the tube 2, which then being inserted through the insertion cap 3 to be locked to the seat tube 4 as illustrated in FIGS. 4 and 5. As the full length of the tube 2 in briolette shape having its one side gradually reducing to a point and another side indicating arc shape to provide low drag, the full length of the tube 2 allows to be elevated inside the insertion cap 3 as desired to be adjusted for its height and secured to the seat tube 4 without prejudice to its drag effect as illustrated in FIGS. 3 and 6.

The inner diameter of the smaller side of the tube 2 may be separately formed a circular insertion hole 21 and a material saving hole 22. The circular insertion hole 21 allows the circular graded portion 12 at the lower end of the joint 1 to be inserted into the tube 2. When required, an additional protrusion (not illustrated) for insertion in relation to the material saving hole 22 can be also provided at the lower end of the joint 1 for both of protrusion and the graded portion 12 to be separately inserted into the circular insertion hole 21 and the material saving hole 22 to achieve even better secured effects.

The tube 2 and the joint 1 may be made as a separate standardized member without considering the size of the inner diameter of the seat tube 4 as long as the insertion cap 3 is in a size capable of matching the inner diameter of the seat tube 4. Therefore, the insertion cap 3 is the only member that requires keeping inventory of various sizes so to pay the benefits of cost saving, reduced size of the inventory and easier control.

Furthermore, one or more than one cuts 33 provided on the wall of the insertion cap 3 also allows one size of the insertion cap 3 to be applicable to bike seat tubes 4 in different inner diameter within the allowance to further reduce the types of specification of the spares. Or alternatively when required, the insertion cap 3 may be forthwith molded in one piece with a selected resilient material (such as rubber).

Based on the configuration of the preferred embodiment of the present invention as disclosed, it is sufficient to have tube 2 being related to a low drag pipe in a given shape while the insertion cap 3 being provided with the clamping hole 31 in a shape corresponding to that of the tube 2. Therefore, the shape of the tube 2 is not limited to the shape as disclosed; it may be made in a triangle, conic or gradually flattened shape to give the equivalent effect as long as such shape complies with the required low drag. Furthermore, it is to be noted that the process for the manufacturing of the present invention is not limited to extrusion, any other equivalent process or any change or replacement for the art of extrusion shall fall within the scope of the claims to be made for the present invention.

What is claimed is:

1. A low drag bike seat stem comprised of a joint and a tube, wherein, the joint has a lower end provided with a graded portion; and the tube has an inner diameter formed with a circular insertion hole and a material saving hole respectively, and wherein, the graded portion at the lower end of the joint is mounted on an upper end of the tube and inserted into the circular insertion hole of the tube.

2. The low drag bike seat stem as claimed in claim 1, wherein, a full length of one side of the tube has a briolette shape gradually reduced to a point while the other side thereof has a comparatively larger arc.

3. The low drag bike seat stem as claimed in claim 1, wherein, the tube is an extruded tube.

* * * * *